(12) United States Patent
Hasty et al.

(10) Patent No.: US 12,087,140 B2
(45) Date of Patent: Sep. 10, 2024

(54) DYNAMIC PROGRAMMING AND VENDING OF A WEARABLE

(71) Applicant: Royal Caribbean Cruises Ltd., Miami, FL (US)

(72) Inventors: Joey Hasty, Miami, FL (US); Jay Schneider, Miami Beach, FL (US); Mary Reilly, Miami, FL (US); Josh Nakaya, Miami, FL (US)

(73) Assignee: Royal Caribbean Cruises, Ltd., Miami, FL (US)

( * ) Notice: Subject to any disclaimer, the term of this patent is extended or adjusted under 35 U.S.C. 154(b) by 603 days.

(21) Appl. No.: 16/834,009

(22) Filed: Mar. 30, 2020

(65) Prior Publication Data

US 2021/0304547 A1   Sep. 30, 2021

(51) Int. Cl.
*G07F 9/00* (2006.01)
*G06Q 50/12* (2012.01)

(52) U.S. Cl.
CPC .............. *G07F 9/009* (2020.05); *G06Q 50/12* (2013.01)

(58) Field of Classification Search
CPC ................................ G07F 9/009; G06Q 50/12
USPC .......... 700/233, 231; 221/9, 21, 67, 289, 303
See application file for complete search history.

(56) References Cited

U.S. PATENT DOCUMENTS

| | | | | |
|---|---|---|---|---|
| 8,050,796 B1* | 11/2011 | Hagen | ................... | G07F 17/26 |
| | | | | 221/6 |
| 2003/0130762 A1* | 7/2003 | Tomassi | ................. | G07C 9/257 |
| | | | | 700/237 |
| 2008/0137889 A1* | 6/2008 | Rass | .................... | H04R 25/558 |
| | | | | 381/314 |
| 2009/0111286 A1* | 4/2009 | Giovannoni | ......... | G06K 19/077 |
| | | | | 439/37 |
| 2016/0228325 A1* | 8/2016 | Kologrivov | ............ | A61H 23/02 |

* cited by examiner

*Primary Examiner* — Nghi H Ly
(74) *Attorney, Agent, or Firm* — CRGO Global; Steven M. Greenberg

(57) ABSTRACT

A method for dynamically programming and distributing a wearable in an automated vending machine includes receiving at the vending machine a request from a guest to issue a wearable and the determination of an identity of the guest from the request. The method additionally includes selecting a wearable within the vending machine from a repository of unprogrammed wearables and moving the selected wearable out of the repository and into a programming tray, within the vending machine, that is communicatively segregated from the repository within the vending machine. The method further includes programming the selected wearable while the selected wearable remains in the programming tray with information corresponding to the determined identity of the guest. Finally, the method includes ejecting the programmed selected wearable for retrieval by the guest at a dispensing outlet that is disposed within the vending machine but that is accessible from outside of the vending machine.

18 Claims, 2 Drawing Sheets

DYNAMIC PROGRAMMING AND VENDING OF A WEARABLE

BACKGROUND OF THE INVENTION

Field of the Invention

The present invention relates to the field of wearable computing devices and more particularly to the distribution of a wearable in a hotel and hospitality environment.

Description of the Related Art

A wearable is a personal article worn by a person as an accessory to clothing. Typical wearables include watches, pendants, necklaces, wristbands and bracelets. But, unlike an ordinary clothing accessory, a wearable incorporates a computing architecture that includes at least a minimum processor, memory, an input method and wireless communications circuitry. The computing architecture allows the accessory to become "smart" and to store therein, important information, such as user identification data, a stored value of currency, or a passkey. The computing architecture also permits a remote computing device to communicate with the memory of the wearable by way of the communications circuitry in order to interrogate the content of the memory. Common to all wearables is a decorative element so that the wearable is more than a computing apparatus affixed to the body of the individual. Instead, the wearable is, in fact, a clothing accessory.

Wearables have emerged as an important and consumer desired element in the travel and leisure industrial segment. Rather than require individual guests of a hotel, amusement park or passenger cruise ship to pay for services while on premises with cash, credit card, or stored value card, a wearable allows each guest to move about the premises, paying for food, drink, activities, souvenirs and other sundry items simply by presenting the wearable within range of an electronic reader. As well, with a wearable, the identity of a guest may be ascertained remotely without inconveniencing the guest with a request to produce an identification card.

Generally, in the hotel and hospitality environment, each guest receives a wearable at the time of check-in, at which time the wearable is programmed to identify the guest and to associate the wearable with a particular guest folio. The programming commonly may be performed with a radio frequency identification (RFID) programming device to the extent that the wearable incorporates RFID as the basis for the communications circuitry, or by way of short-range wireless communications to the extent that the wearable incorporates Bluetooth or near field communications (NFC) as a basis for the communications circuitry. In some instances, the programming of a wearable may occur after check-in as an enhanced service requested by the guest, but in that instance, the guest still is required to receive the wearable at a service location such as the front desk where the wearable may be appropriately programmed according to the identity of the guest.

For a small location with a limited number of guests, it is of little trouble to program a select few wearables for requesting guests, but for larger environments such as large hotel and conference centers, amusement parks and cruise ships, the process of programming a wearable for each guest at the time of check in can be inefficient and time consuming. As well, not all guests are eager to pay for the enhanced convenience of a wearable. Processing many hundreds of not thousands of requests to program wearables can then become overburdensome on the guest services staff. As such, it would be desirable to distribute wearables in an automated fashion. However, so much is not possible owing to the requirement that each wearable must be customized at the time of dispensing for each guest.

BRIEF SUMMARY OF THE INVENTION

Embodiments of the present invention address deficiencies of the art in respect to the distribution of wearables and provide a novel and non-obvious method, system and computer program product for the automated dispensing of a wearable. In an embodiment of the invention, a vending machine that dynamically programs and distributes a wearable includes a vending machine with a repository of unprogrammed wearables communicatively segregated from a programming tray disposed within the vending machine and a dispensing outlet that is separate from the programming tray and the repository and that is accessible from an exterior portion of the vending machine. The machine also includes communications circuitry adapted to transmit data in a wireless signal to a wearable and to receive data in a wireless signal transmitted from the wearable. The machine yet further includes a computer disposed within the vending machine, that includes memory and at least one processor, and a communicative linkage with the repository and the programming tray and also the communications circuitry. Finally, the vending machine includes a dynamic programming and distribution module stored in the memory of the computer.

The module includes computer program instructions enabled during execution in the computer to receive at the vending machine a request from a guest to issue a programmed one of the unprogrammed wearables. The program instructions further are enabled during execution to determine from the request, an identity of the guest and to select one of the unprogrammed wearables from the repository. The program instructions yet further are enabled to signal the repository to move the selected one of the unprogrammed wearables from the repository and into the programming tray and then to signal the communications circuitry to program the selected one of the unprogrammed wearables, while the selected one of the unprogrammed wearables remains in the tray, with information corresponding to the determined identity of the guest. Finally, the program instructions are enabled during execution to signal the programming tray to eject the programmed selected one of the wearables into the dispensing outlet for retrieval by the guest.

In one aspect of the embodiment, the machine further includes a card reader adapted to read an identification card so as to determine the identity of the guest. Alternatively, or in addition, the machine may include a biometric reader adapted to biometrically scan an anatomical portion of the guest so as to determine the identity of the guest. In regard to the former, the request may be initiated upon receipt in the card reader of the identification card.

In another aspect of the embodiment, the request indicates a particular style of wearable such that only a wearable amongst the unprogrammed wearables having the particular style is selected by the program instructions of the module.

In even yet another aspect of the embodiment, the programming of the selected wearable includes the communications circuitry transmitting to the wearable a directive to store in memory of the wearable, an identity of the guest and the program instructions directing storage in a registry remote from the vending machine of a unique identifier of the selected wearable and the identity of the guest.

In another embodiment of the invention, a method for dynamically programming and distributing a wearable in an automated vending machine includes receiving at the vending machine a request from a guest to issue a wearable and the determination of an identity of the guest from the request. The method additionally includes selecting a wearable within the vending machine from a repository of unprogrammed wearables and moving the selected wearable out of the repository and into a programming tray, within the vending machine, that is communicatively segregated from the repository within the vending machine. The method further includes programming the selected wearable while the selected wearable remains in the programming tray with information corresponding to the determined identity of the guest. Finally, the method includes ejecting the programmed selected wearable for retrieval by the guest at a dispensing outlet that is disposed within the vending machine but that is accessible from outside of the vending machine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamically programming and distributing a wearable in an automated vending machine. In accordance with an embodiment of the invention, a vending machine defines therein a first chamber as a repository of unprogrammed wearables, and a second chamber as a programming tray. The second chamber and the first chamber are communicatively segregated from one another so that communicative signals transmitted into the second chamber are not received in the first chamber sufficient for processing by any of the unprogrammed wearables. The vending machine also defines a dispensing outlet accessible to an exterior portion of the vending machine and in communication with the programming tray. In operation, computer program instructions executing in a computer of the vending machine responds to a request by a guest by identifying the guest and selecting one of the unprogrammed wearables for distribution to the guest. Then, the selected unprogrammed wearable is moved from the first chamber to the second chamber wherein the wearable is programmed with wireless communications to store specific information relating to the identity of the guest. Finally, the program instructions direct the second chamber to eject the now programmed wearable into the dispensing outlet for retrieval by the guest. In this way, the wearable is able to be programmed and dispensed in an automated vending machine without requiring the assistance of a guest services employee.

Figure 1:
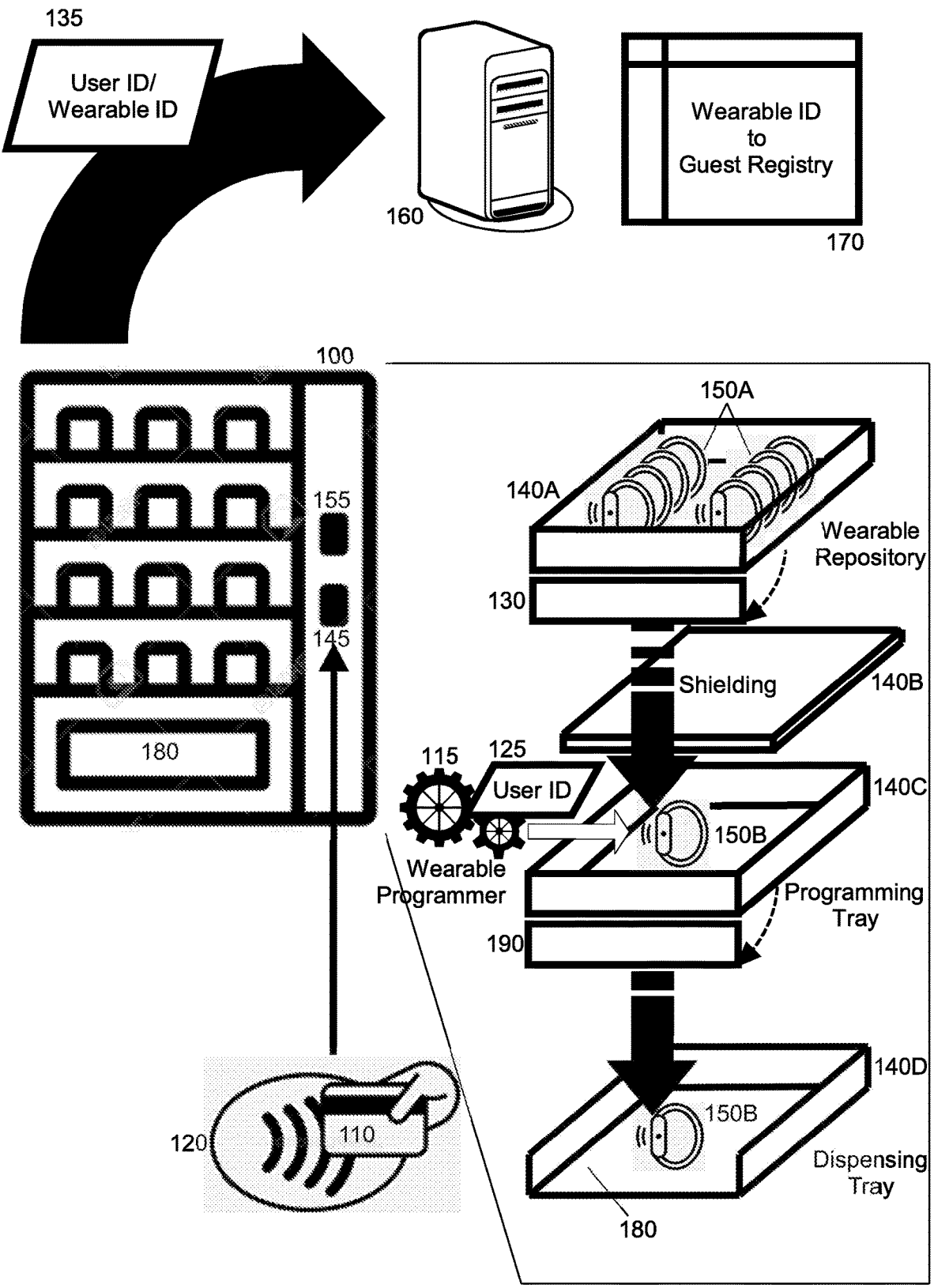
FIG. 1 is pictorial illustration of a process for dynamically programming and distributing a wearable in an automated vending machine.

In further illustration, FIG. 1 pictorially shows a process for dynamically programming and distributing a wearable in an automated vending machine. As shown in FIG. 1, a guest presents identification material 110, 120 to a reader 145 of the automated vending machine 100 so that the reader 145 extracts user identification information 125 of the guest. In this regard, the identification material 110, 120 may be a machine readable card 110 such as those with a magnetic stripe encoding thereon identifying information, or such as those with an embedded machine readable chip encoding thereon identifying information, or a smartphone transmitting over short range wireless radio frequency communications, encoded identifying information. Optionally, the identification material 110, 120 may be biometric information such as a fingerprint, iris scan or face scan performed by a biometric reader (not shown) disposed in the automated vending machine 100.

Through a display 155 provided by the automated vending machine 100, the guest selects a particular type or style of an unprogrammed wearable 150A present in a wearable repository 140A positioned within the automated vending machine 100. The particular type of style can include a bracelet of particular color or with particular design, a pendant of particular color and design, eyewear or a glasses strap of particular color and design, to name only a few examples. Once the guest has selected the particular type and style of the unprogrammed wearable 150A, the automated vending machine 100 moves the selected wearable 150B from the wearable repository 140A to a programming tray 140C, for instance by activating a conveyor belt holding the unprogrammed wearables 150A of the selected type and style towards a door 130 which opens to the programming tray 140C below causing the selected wearable 150B to drop into the programming tray 140C.

Of importance, the wearable repository 140A and the programming tray 140C are separated by shielding 140B that shields the unprogrammed wearables 150A in the wearable repository 140A from electromagnetic radiation emitted by a wearable programmer 115 disposed in the automated vending machine 100. In this regard, once the selected wearable 150B is present in the programming tray, the wearable programmer 115 emits radiation sufficient to program the user identification information 125 of the guest onto the selected wearable 150B. Contemporaneously, the wearable programmer 115 interrogates the selected wearable 150B to retrieve an identification of the selected wearable 150B and to confirm the programming of the selected wearable with the user identification information 125.

Thereafter, the automated vending machine 100 moves the now programmed, selected wearable 150B into a dispensing tray 140D. As before, a door 190 of the programming tray 140C may activate to allow the selected wearable 150B to drop into the dispensing tray 140D below. The dispensing tray 140D itself includes an opening 180 at one end accessible from an exterior portion of the automated vending machine 100 so that the guest may then retrieve the selected wearable 150B now programmed with the user identification information 125. Contemporaneously, a message 135 is transmitted to a remotely disposed server 160 over computer communications network (not shown) containing both the user identification information 125 and the identification of the selected wearable 150B so that a record is written in a guest registry 170 correlating the guest with the selected wearable 150B and an associated billing folio.

Figure 2:
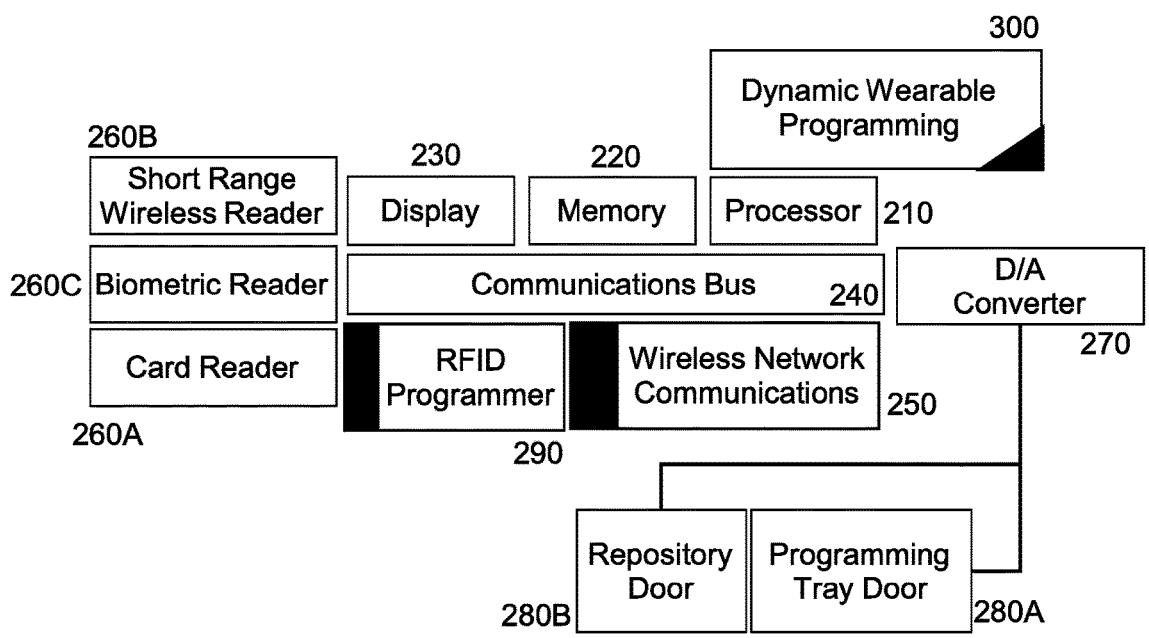
FIG. 2 is a schematic illustration of an automated vending machine adapted for dynamically programming and distributing a wearable; and, FIG. 3 is a flow chart illustrating a process for dynamically programming and distributing a wearable in an automated vending machine.

The process described in connection with FIG. 1 may be implemented within an automated vending machine. In further illustration, FIG. 2 schematically shows an automated vending machine adapted for dynamically programming and distributing a wearable. The machine includes a computer that includes at least one processor 210, memory 220 and a display 230. A communications bus 240 is provided over which external components may communicate with the processor 210. A digital to analog converter 270 is coupled to the communications bus 240 at one end and to a repository door 280B and a programming tray door 280A at the other end so that the processor is able to directionally actuate each of the doors 280A, 280B.

The communications bus 240 also acts as an interface to the processor 210 for one or more of a card reader 260A adapted to read information encoded on a wallet sized card, such as a magnetic stripe reader, chip card reader, or RFID reader, a short range wireless radio frequency communications reader 260B such as a Bluetooth receiver or NFC reader, or a biometric reader 260C such as a face scanner or finger print scanner. The communications bus 240 even yet further acts as an interface to an RFID programmer 290 adapted to receive directives from the processor 210 directing the RFD programmer 290 both to encode provided information onto a target RFID chip, and also to interrogate the target RFID chip to retrieve into the memory 220 encoded information stored on the target RFID chip. Finally, the communications bus 240 acts as an interface to wireless communications circuitry 250 enabling wireless communications of data stored in the memory 220 to a remotely disposed computing device.

Notably, a dynamic wearable programming module 300 is disposed in the memory 220. The module 300 includes computer program instructions operable upon execution by the processor 210 to identify a guest through one of the card reader 260A, short range wireless reader 260B, or biometric reader 260. The computer program instructions further are operable to receive a selection of a type of wearable stored in a repository of unprogrammed wearables. The computer program instructions yet further are operable to activate the repository door 280B to move the selected unprogrammed wearable into a programming tray. The computer program instructions even yet further are operable to direct the RFID programmer 290 to program the selected unprogrammed wearable with identifying information for the guest and to interrogate the wearable for a wearable identifier. Finally, the computer program instructions are operable to activate the programming tray door 280A to move the now programmed wearable to a dispensing tray and to transmit a message through wireless communications circuitry 250 including the wearable identifier and the identifying information for the guest to a remote server.

Figure 3:
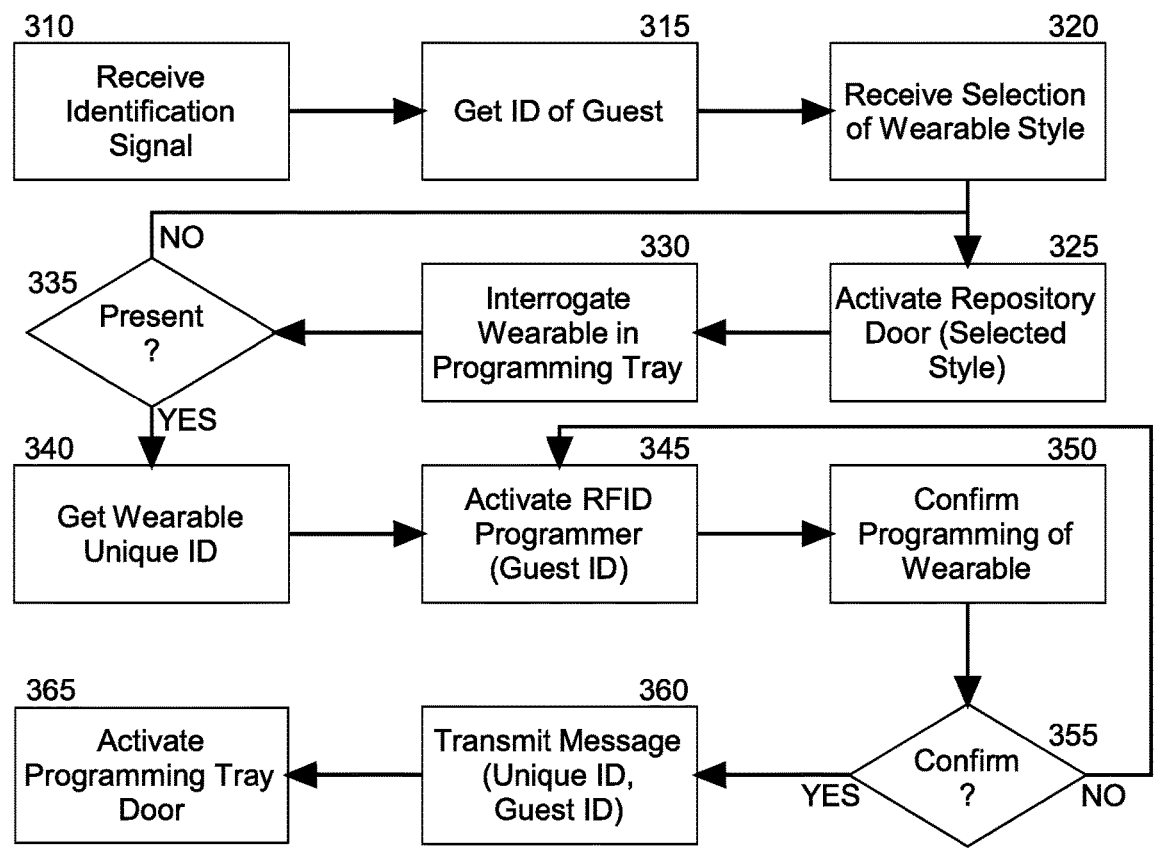

In even yet further illustration of the operation of the dynamic wearable programming module 300, FIG. 3 is a flow chart illustrating a process for dynamically programming and distributing a wearable in an automated vending machine. Beginning in block 310, an identification signal is received in the automated vending machine, for instance the insertion of an identification card with a magnetic strip into a card reader of the automated vending machine, or the receipt of a wireless signal identifying the guest in a wireless receiver of the automated vending machine, or the receipt of a fingerprint or face scan of the guest in a biometric reader of the automated vending machine. Then, in block 315, an identification of the guest is received such as a unique number, e-mail address, unique name or unique image.

In block 320, a selection of a style of a wearable is received from the guest such as a preferred color or type of wearable. Then, in block 325, an unprogrammed wearable in the wearable repository is moved from the repository to the programming tray, for instance, by actuating a conveyor belt holding the wearables and the opening of the repository door to permit the wearable to drop into the programming tray. In block 330, the RFID reader interrogates the wearable in the tray. In decision block 335, it is determined if the wearable is present in the programming tray based upon the interrogation, e.g. if no information is retrieved from the interrogation, the process returns to the activation of the repository door in block 325. But, otherwise in block 340 the RFID reader retrieves a unique identification number of the wearable in the programming tray.

In block 345, the RFID programmer is then activated to program the selected wearable in the programming tray with the identification data of the guest. In block 350, thereafter, the RFID programmer interrogates the wearable to confirm the programming of the wearable with the identification data. In decision block 355, if the programming of the wearable is not confirmed, the process returns to block 345 for re-programming of the wearable. But otherwise, in block 360 a message is transmitted to a remote server correlating the identification data with the unique identification number of the wearable. Finally, in block 365 the programming tray door is activated to permit the movement of the programmed wearable into the dispensing tray retrievable by the guest.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for dynamically programming and distributing a wearable in an automated vending machine, the method comprising:
   receiving at the vending machine a request from a guest to issue a wearable;
   determining an identity of the guest from the request;
   selecting a wearable within the vending machine from a repository of unprogrammed wearables;
   moving the selected wearable out of the repository and into a programming tray, within the vending machine, that is communicatively segregated from the repository within the vending machine;
   programming the selected wearable while the selected wearable remains in the programming tray with information corresponding to the determined identity of the guest; and,
   ejecting the programmed selected wearable for retrieval by the guest at a dispensing outlet that is disposed within the vending machine but that is accessible from outside of the vending machine.

2. The method of claim 1, wherein the identity is determined by reading data stored on an identification card provided by the guest to a card reader disposed within the vending machine.

3. The method of claim 1, wherein the identity is determined by biometrically scanning a portion of the guest utilizing a biometric reader disposed within the vending machine.

4. The method of claim 1, wherein the request indicates a particular style of wearable such that only a wearable amongst the unprogrammed wearables having the particular style is selected.

5. The method of claim 2, wherein the request is initiated upon receipt in the card reader of an identity card.

6. The method of claim 1, wherein the programming of the selected wearable includes storing in memory of the wearable, an identity of the guest and storing in a registry remote from the vending machine a unique identifier of the selected wearable and the identity of the guest.

7. A vending machine system adapted to dynamically program and distribute a wearable, the system comprising:
   a vending machine comprising a repository of unprogrammed wearables communicatively segregated from a programming tray disposed within the vending machine and a dispensing outlet that is separate from the programming tray and the repository and that is accessible from an exterior portion of the vending machine;
   communications circuitry adapted to transmit data in a wireless signal to a wearable and to receive data in a wireless signal transmitted from the wearable;

a computer disposed within the vending machine, the computer comprising memory and at least one processor, and a communicative linkage with the repository and the programming tray and also the communications circuitry; and, a dynamic programming and distribution module stored in the memory of the computer, the module comprising computer program instructions enabled during execution in the computer to perform:

receiving at the vending machine a request from a guest to issue a programmed one of the unprogrammed wearables;

determining an identity of the guest from the request;

selecting one of the unprogrammed wearables from the repository;

signalling the repository to move the selected one of the unprogrammed wearables from the repository and into the programming tray;

signalling the communications circuitry to program the selected one of the unprogrammed wearables, while the selected one of the unprogrammed wearables remains in the tray, with information corresponding to the determined identity of the guest; and, signalling the programming tray to eject the programmed selected one of the wearables into the dispensing outlet for retrieval by the guest.

8. The system of claim 7, wherein the machine further comprises a card reader adapted to read an identification card so as to determine the identity of the guest.

9. The system of claim 7, wherein the machine further comprises a biometric reader adapted to biometrically scan an anatomical portion of the guest so as to determine the identity of the guest.

10. The system of claim 7, wherein the request indicates a particular style of wearable such that only a wearable amongst the unprogrammed wearables having the particular style is selected by the program instructions of the module.

11. The system of claim 8, wherein the request is initiated upon receipt in the card reader of the identification card.

12. The system of claim 8, wherein the programming of the selected wearable includes the communications circuitry transmitting to the wearable a directive to store in memory of the wearable, an identity of the guest and the program instructions directing storage in a registry remote from the vending machine of a unique identifier of the selected wearable and the identity of the guest.

13. A computer program product for dynamically programming and distributing a wearable in an automated vending machine, the computer program product including a non-transitory computer readable storage medium having program instructions embodied therewith, the program instructions executable by a device to cause the device to perform a method including:

receiving at the vending machine a request from a guest to issue a wearable;

determining an identity of the guest from the request;

selecting a wearable within the vending machine from a repository of unprogrammed wearables;

moving the selected wearable out of the repository and into a programming tray, within the vending machine, that is communicatively segregated from the repository within the vending machine;

programming the selected wearable while the selected wearable remains in the programming tray with information corresponding to the determined identity of the guest; and, ejecting the programmed selected wearable for retrieval by the guest at a dispensing outlet that is disposed within the vending machine but that is accessible from outside of the vending machine.

14. The computer program product of claim 13, wherein the identity is determined by reading data stored on an identification card provided by the guest to a card reader disposed within the vending machine.

15. The computer program product of claim 13, wherein the identity is determined by biometrically scanning a portion of the guest utilizing a biometric reader disposed within the vending machine.

16. The computer program product of claim 13, wherein the request indicates a particular style of wearable such that only a wearable amongst the unprogrammed wearables having the particular style is selected.

17. The computer program product of claim 14, wherein the request is initiated upon receipt in the card reader of an identity card.

18. The computer program product of claim 13, wherein the programming of the selected wearable includes storing in memory of the wearable, an identity of the guest and storing in a registry remote from the vending machine a unique identifier of the selected wearable and the identity of the guest.

* * * * *